United States Patent [19]

Campbell et al.

[11] Patent Number: 5,768,495

[45] Date of Patent: Jun. 16, 1998

[54] METHOD AND APPARATUS FOR PRINTER DIAGNOSTICS

[75] Inventors: Scott O. Campbell; Tom E. Dubois. both of Spring; Nam H. Luong. Houston, all of Tex.

[73] Assignee: Compaq Computer Corporation. Houston, Tex.

[21] Appl. No.: 725,588

[22] Filed: Oct. 3, 1996

Related U.S. Application Data

[63] Continuation of Ser. No. 517,116, Aug. 21, 1995, abandoned, which is a continuation of Ser. No. 937,491, Aug. 28, 1992, abandoned.

[51] Int. Cl.$^6$ .................................................. G06F 11/00
[52] U.S. Cl. ............... 395/183.01; 395/101; 364/551.01
[58] Field of Search ........................ 395/183.01, 183.03, 395/183.22, 101, 103, 652; 324/73.1, 158.1; 371/21.1; 364/267, 551.01, DIG. 1, DIG. 2

[56] References Cited

U.S. PATENT DOCUMENTS

| 4,194,113 | 3/1980 | Fulks et al. ............... 371/22.1 |
| 4,617,638 | 10/1986 | Krause et al. ............... 364/557 |
| 4,694,408 | 9/1987 | Zaleski ............... 364/551 |
| 4,760,329 | 7/1988 | Andreano ............... 371/22.1 |
| 4,837,764 | 6/1989 | Russello ............... 371/20 |
| 4,953,165 | 8/1990 | Jackson ............... 371/16.1 |
| 4,964,124 | 10/1990 | Burnett ............... 371/15.1 |
| 5,173,855 | 12/1992 | Nielsen ............... 364/420 |
| 5,210,703 | 5/1993 | Hodgson ............... 364/525 |
| 5,357,519 | 10/1994 | Martin ............... 371/15.1 |
| 5,432,705 | 7/1995 | Severt ............... 364/481 |

OTHER PUBLICATIONS

Snipes. User Configuration Portable ATE. Autotestcon'90. San Antonio, TX, 17–21 Sep. 1990, pp. 33–39.

Rysanek et al., A Systems Approach to Portable Testers Total Test System Integration. Autotestcon '88. Minneapolis MN 4–6 Oct. 1988, pp. 107–110.

Cundiff et al., An Embedded Expert System for Portable ATE. Autotestcon '88. Minneapolis, MN, 4–6 Oct. 1988, pp. 155–159.

*Primary Examiner*—Robert W. Beausoliel, Jr.
*Assistant Examiner*—Dieu-Minh Le
*Attorney, Agent, or Firm*—Vinson & Elkins L.L.P.

[57] ABSTRACT

A portable, reprogrammable printer diagnostic controller comprising a microcontroller, an EPROM for storing operational programs, a "flash" memory for programmably storing data to be used in the diagnosis of the printer, and connectors for coupling the system to both a computer for the downloading of software into the system and to a printer for downloading the stored programs into a printer for diagnostic testing.

10 Claims, 4 Drawing Sheets

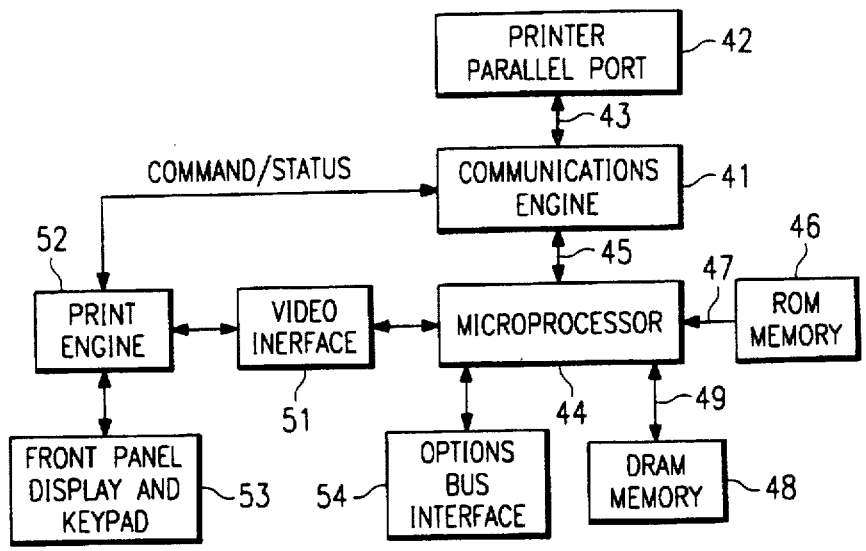

FIG. 5

| PDT | PRINTER |
|---|---|
| -Initiates dialogue | |
| Ready to receive data in nibble mode | |
| | -Responds dialogue |
| -Acknowledges response (reads loop control hint) | |
| | -Sends Diagnostic Code Downloading Command |
| -Responds acknowledge | |
| -Sends Host Identity | |
| -Sends back Target Identity | |
| | -Responds acknowledge |
| -Sends Data Packet: | |
| . Data Header | |
| . 198 bytes of data | |
| . Checksum | |
| | -Responds acknowledge |
| -Repeats Until Done | |
| | -Repeats Until Done |
| -Sends Done Header | |
| | -Responds Acknowledge |

FIG. 8

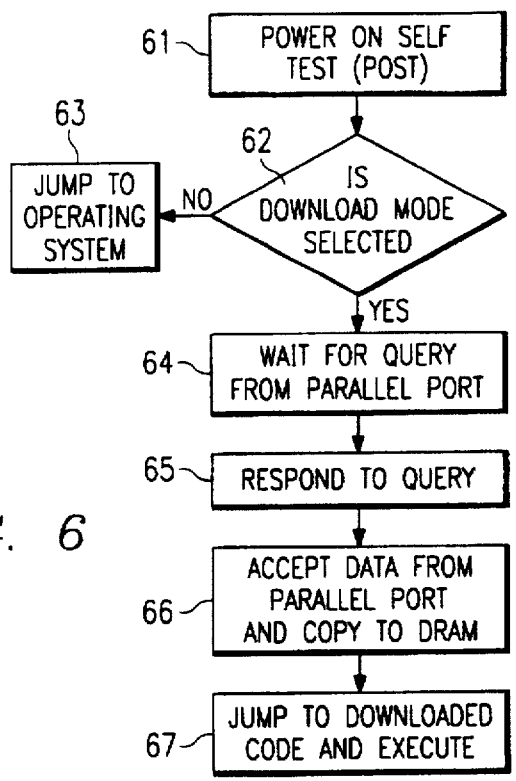

FIG. 6

| HOST (PC) | PDT |
|---|---|
| −Initiates dialogue<br>    Ready to receive data in nibble mode | |
| | −Responds dialogue |
| −Acknowledges response (read loop control hint) | |
| | −Sends header: |
| | . 0xAA |
| | . 0x55 |
| | . Target Identity |
| −Responds acknowledge | |
| −Sends Host Identity | |
| −Sends back Target Identity | |
| | −Responds acknowledge |
| −Sends Command Packet: | |
|   . Byte 0: Header ( 0xCC) | |
|   . Byte 1: Command 1 | |
|   . Byte 2-5: Data byte<3:0> | |
| | −Responds acknowledge |

FIG. 7

METHOD AND APPARATUS FOR PRINTER DIAGNOSTICS

RELATED APPLICATIONS

This application which is a continuation of application Ser. No. 08/517,116, filed Aug. 21, 1995, and entitled "Method and Apparatus for Printer Diagnostics," now abandoned which is a continuation of application Ser. No. 07/937,491, filed Aug. 28, 1992, and entitled "Method and Apparatus for Printer Diagnostics", now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyrights whatsoever.

1. Field of the Invention

The invention relates to a method and apparatus for printer diagnostics control and, more particularly, to the installation of printer diagnostics software into a printer at a remote location.

2. History of the Related Art

In the testing of computer printers, and the maintenance and repair of such printers in an operational environment, a service technician often desires to download to the printer a particular body of software for testing and/or diagnostics within the printer. The printer may then respond to such diagnostic software by printing a test pattern or other human readable output indicating to the service technician the status and/or condition of the printer and its subsystems.

In prior art systems, such diagnostic tests are performed on a printer by loading a particular file of diagnostic code into the printer from an attached computer. The printer then responds to the particular diagnostic code by producing a printed output which can be reviewed by the service technician in order to make a determination as to the condition of the printer.

One problem with the current practice of down loading diagnostic code from a computer to the printer being serviced is that the computer must necessarily be available and connected to the printer. It is frequently the case that field technicians servicing and/or testing printers in an operational environment must travel to remote locations in order to perform the service and tests. Such arrangements present a problem to the field and service technicians since the downloading of diagnostic code into the printer requires that a computer either be available on site or be transported to the site of the printer for connection to the printer and such is not always possible or practical.

One solution to the problem of the remote servicing of printers has been to equip a portable device with a plug capable of integrating with an input port of a printer and with a read only memory (ROM) in which there is stored certain print files which can be downloaded into the printer to provide data for printing certain test patterns. While such portable systems provide certain advantages, they are unable to provide full diagnostic testing of printers because of the limited character of the print file data which can be stored in the ROM.

It would be highly desirable for a field technician to have a system by which a printer could be serviced in a remote location by downloading full diagnostic code to the printer without having to directly connect the printer to a computer. In addition, it would be highly useful to be able to selectively reprogram such a portable device with different forms of executable diagnostic programs as well as print files to be used for the testing and servicing of printers in the field.

SUMMARY OF THE INVENTION

In one aspect, the present invention includes a system for the diagnostic testing of printers at remote locations by downloading software from a computer into a selectively reprogrammable memory within a portable diagnostic controller. The portable controller is then transported to a remote location and connected to a printer. The software stored in the reprogrammable memory of the portable controller is the downloaded into a printer for testing of the printer. The software may included both executable code for the diagnosis of operating conditions within the printer and data files to be printed by the printer.

In another aspect, the invention includes a printer diagnostic controller for use in diagnostic testing and servicing of printers at remote locations. The controller includes a portable housing having a first connector at one end for connection to the parallel port of a computer and a second connector at the other end for connection to the parallel port of a printer. A reprogrammable memory is mounted within the housing and a microcontroller is included within the housing and connected to the reprogrammable memory for, first, selectively coupling software through the first connector into the reprogrammable memory and, then, selectively coupling software through the second connector from the reprogrammable memory into a printer for use in diagnosing the operating condition of the printer.

In a still further aspect the invention includes a method for diagnosing operating conditions within a printer having first and second memories therein which includes providing in the first memory of the printer, operational software for switching of control of the printer from software contained within the first memory to software contained within the second memory. A portable printer diagnostic controller is provided with a programmable memory which stores a diagnostic program within the programmable memory of the diagnostic controller. The diagnostic controller is connected to the printer the diagnostic program is downloaded into the second memory within the printer. The functions of the printer are switched from the software contained within the first memory to the diagnostic program contained within the second memory for diagnosing the operation of the printer.

In yet another aspect, the system of the present invention includes a portable, reprogrammable printer diagnostic controller comprising a microcontroller, an EPROM for storing operational programs, an electrically erasable "flash" memory for reprogrammably storing data to be used in the diagnosis of the printer, and connectors for coupling the system to both a computer for the downloading of software into the system and to a printer for downloading the stored programs into a printer for diagnostic testing.

BRIEF DESCRIPTION OF THE DRAWINGS

For a more complete understanding of the present invention and for further objects and advantages thereof, reference can now be had to the following description, taken in conjunction with the accompanying drawing, in which:

FIG. 5 is a block diagram of a printer with which the printer diagnostic controller of the present invention may be used; and FIG. 6 is a flow chart illustrating one use of the printer diagnostic controller of the present invention with the printer of FIG. 5;

FIG. 7 is a chart illustrating commands used in the downloading of diagnostic code from a host computer to the printer diagnostic controller of the present invention; and FIG. 8 is a chart illustrating commands used in the downloading of diagnostic code from the printer diagnostic controller of the present invention to a printer.

DETAILED DESCRIPTION

Figure 1:
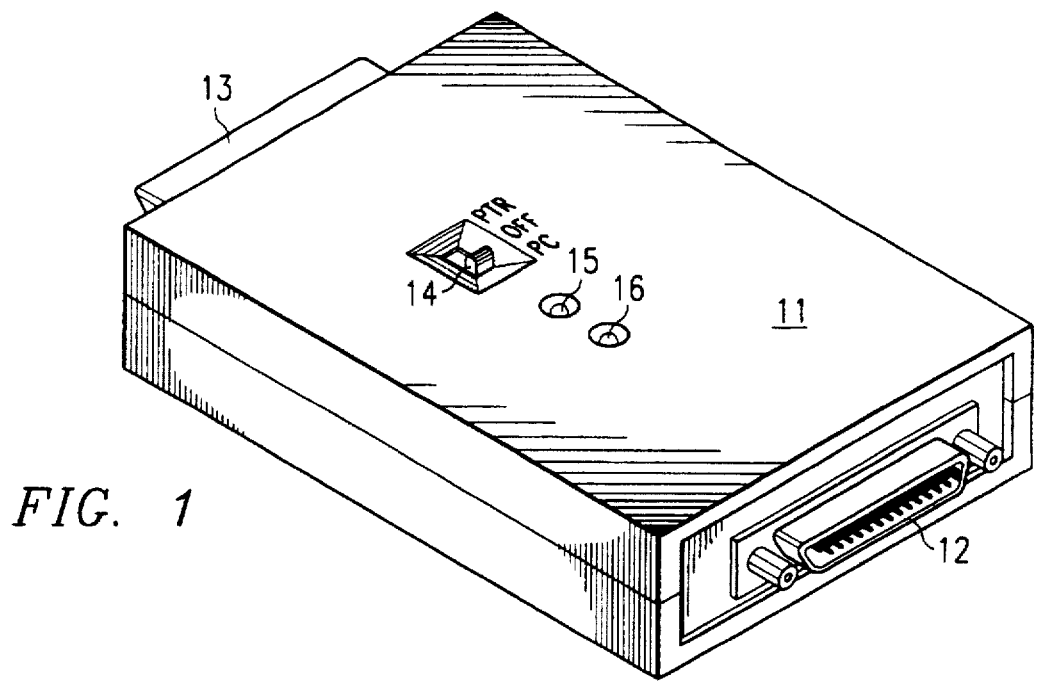
FIG. 1 is a perspective view of a portable printer diagnostics controller constructed in accordance with the present invention.

Referring first to FIG. 1, there is shown a printer diagnostic controller constructed in accordance with the present invention. An enclosed portable housing 11 includes a standard 25 pin D-connector 12 located at one end for the reception of a standard cable for connection to the parallel port of a computer such as a PC. The other end of the housing 11 has mounted thereon a 36 pin Centronics parallel port connector 13 for connection to a cable for coupling to the standard Centronics connector of a printer. Alternatively, the connectors 12 and 13 may be mounted on flat cables (not shown) extending from each end of the housing 11. A three-position control switch 14 may assume a central "off" position at which no power is supplied to the circuitry within the housing 11. A second "PC" position applies power to the system and signals the microcontroller 21 (FIG. 2) within the housing 11 to connect to a PC for the downloading of software into the flash memory 23 within the housing 11 through the connector 12. Similarly, the switch 14 can be moved to a third "PTR" position at which the circuitry is configured for downloading of software from the flash memory 23 within the housing 11 to a printer through the printer connector 13. A progress/ready LED 15 indicates the status of operation of the controller by flashing during the downloading operation and by remaining steadily illuminated when ready to receive code from a PC or after code is successfully downloaded into a printer. A battery LED 16 is illuminated when the battery reaches a pre-selected low voltage level.

Figure 2:
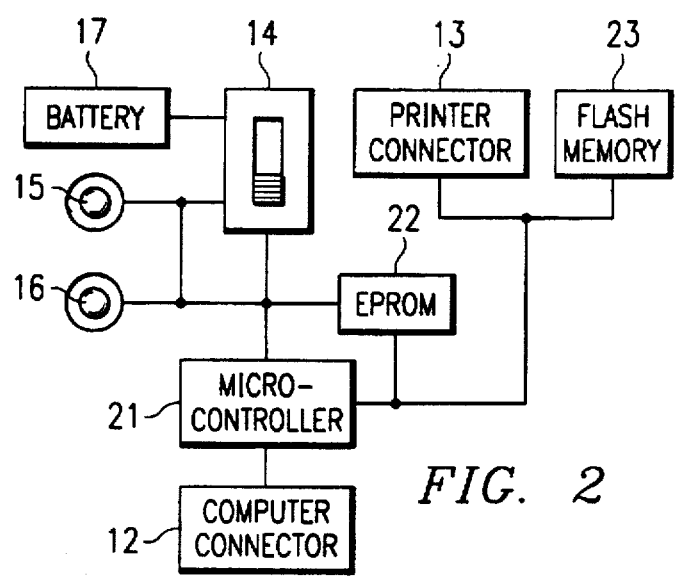
FIG. 2 is a block diagram of the printer diagnostic controller shown in FIG. 1.

Referring next to FIG. 2, there is illustrated a block diagram of the controller of the present invention showing that the switch 14 is connected to control the current flow from a supply battery 17, which may, for example, be a 9 volt cell, as well as to supply power to the components of the system. A position signal from the three-position switch 14 enables the microcontroller 21 to determine whether the system is connected to a printer or a PC, and to configure the components within the system accordingly. Both the 25-pin computer connector 12 and the 36-pin printer connector 13 are connected to the microcontroller 21 which may comprise, for example, an NEC-uPD78213 8-bit microcontroller. An EPROM 22 as well as a flash memory 23 are also connected to the connectors 12 and 13 under the control of the microcontroller 21. The flash memory 23 is an EEPROM which, upon the application of a 12-volt potential, is erased in its entirety; individual bytes cannot be erased. The printer diagnostic controller contains circuitry (not shown) for the conversion of the 9-volt potential from the battery 17 to a 12-volt potential for erasing and programming the flash memory 23.

In general, placing the three-position switch 14 into the PC position sends a signal via a control line to the microprocessor 21 such that it configures the system for hand shaking and data exchange with the 25-pin computer connector 12 when it is connected by cabling to the parallel port of a PC. Similarly, positioning of the switch 14 into the opposite "PC" position, sends a different control signal to the microcontroller 21 so that it configures the system for data exchange with the parallel port of a printer via the 36-pin Centronics printer connector 13. The EPROM 22 stores the instructions for operation of the microcontroller 21, while the flash memory 23 is selectively reprogrammable to store both executable diagnostic software for loading into a printer for testing of that printer, as well as print-files for use by the printer in the execution of certain printer tests under control of the diagnostic software.

Figure 3:
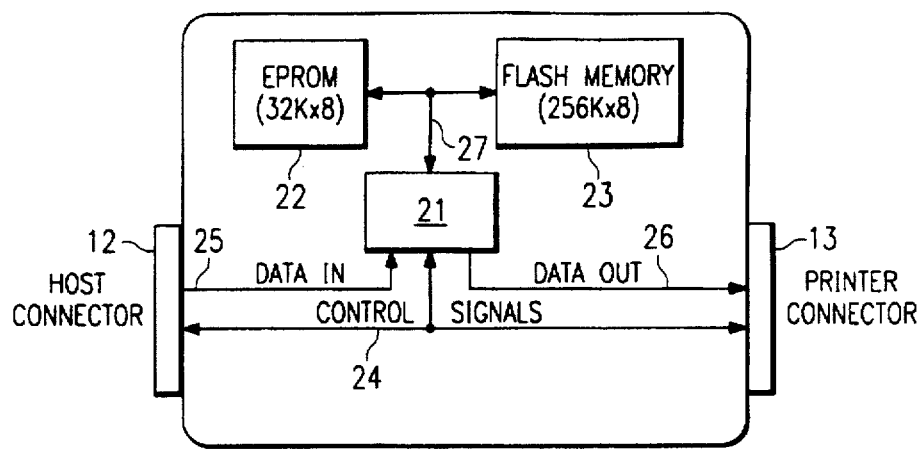
FIG. 3 is a block diagram of the data handling components of the printer diagnostic controller of FIG. 1.

Referring next to FIG. 3, there is shown a block diagram of the data-handling components of the printer diagnostics controller of the present invention. FIG. 3 illustrates that the connector 12 for coupling to a host PC is connected to the microcontroller 21 by means of a control bus 24 and a data bus 25. Similarly, the printer connector 13 is also connected to the microcontroller 21 by means of the control bus 24 as well as a data bus 26. The microcontroller 21 is coupled to both the EPROM 22 and the flash memory 23 by means of a bus structure 27. Thus, under control of the microcontroller 21, control signals are exchanged with a PC via the control bus 24 to download data from the PC into the flash memory 23 through the microcontroller 21 and bus structure 27. In a similar manner, the exchange of control signals over the bus 24 coupled to the printer connector 13 enables the microcontroller 21 to download data from the flash memory 23 through the structure 27 and out via the data bus 26 into the printer. The EPROM 22 is accessed by the microcontroller 21 to provide the necessary control instructions for it to handle the data exchange both between the PC and the printer.

Figure 4:
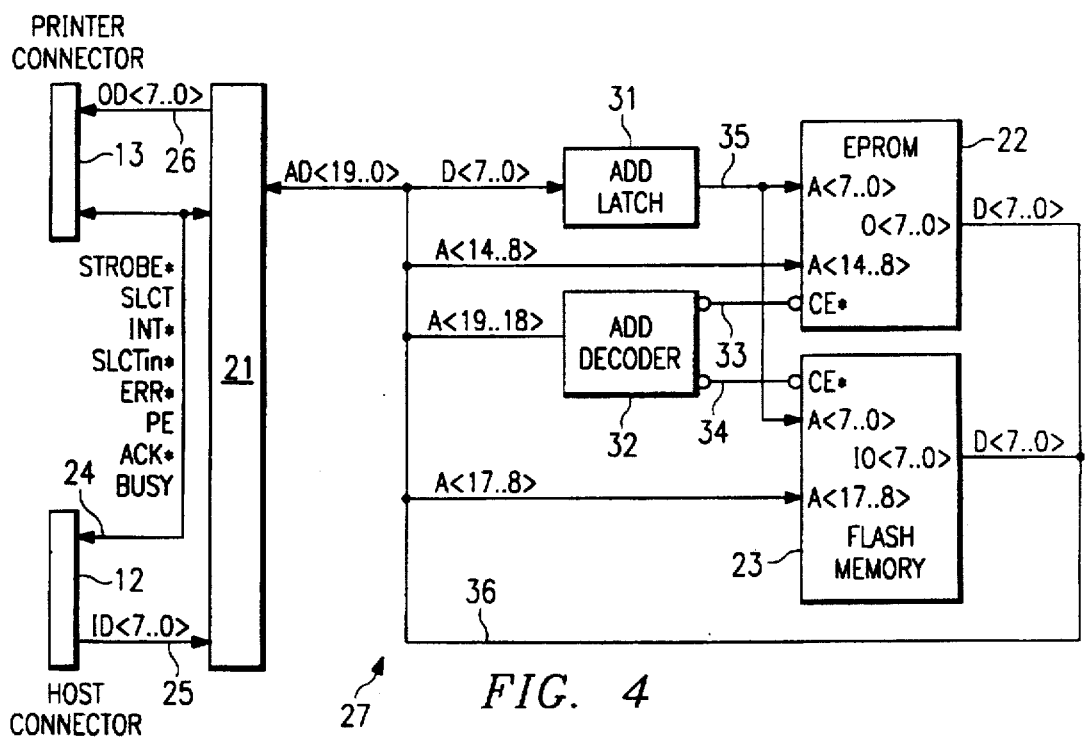
FIG. 4 is a block diagram of the data handling components of FIG. 3, illustrating the data bus structure therebetween.

Referring next to FIG. 4, there is illustrated the bus structure associated with data exchange within the printer controller of the present invention. The PC (host) connector 12 is coupled to the microprocessor 21 by means of an 8-bit control bus 24 and by an 8-bit data bus 25. Similarly, the printer connector 13 is coupled to the microprocessor 21 by means of the 8-bit control bus 24 as well as the 8-bit data bus 26. The bus structure 27 comprises a 20-bit address/data bus, bits 0–7 of which are coupled to an address latch 31. Bits 8–14 are connected as the upper address bus to the EEPROM 22, while bits 18 and 19 are connected to an address decoder 32, and bits 8–17 are connected as an address bus to the flash memory 23. The address latch 31 enables the bits 0 to 7 also to be used as the data bits 0 to 7 to the EEPROM 22 as well as the flash memory 23. Address bits 18 and 19 are decoded in the address decoder 32, and a chip-enable signal is sent either to the EEPROM on lead 33 or the flash memory 23 on lead 34 depending upon which device is being addressed. Data exits both the EEPROM 22 and the flash memory 23 via data bus 36.

Referring next to FIG. 5, there is shown a block diagram of a printer with which one embodiment of the printer diagnostic controller of the present invention may be used. The printer in FIG. 5 comprises a communications engine 41 for communication with a 36-pin Centronics printer parallel port 42 via a bus 43 having 8 data lines and 8 control lines. A microprocessor 44 is coupled to the communications engine 41 by means of an 8-bit bus 45 and may comprise a RISC processor such as the AMD 29000 microprocessor for controlling the operation of the printer. A ROM memory 46 is connected to the processor via a 32-bit bus 47 for the loading of operational control instructions into the microprocessor 44. A DRAM memory 48 is also connected to the microprocessor 44 for the storage of print-files to be printed by the printer as well as diagnostic software as will be further described below. The DRAM 48 may, for example, be a 4 MB memory unit, and may be expanded with the installation of additional memory devices. A print engine video interface 51 couples the microprocessor 44 to a print engine 52 which executes the printing function of the printer under control of the communications engine 41. A front panel display and keypad 53 is located on the outside of the printer and is coupled through the print engine and the communications engine 41 to the microprocessor 44. An options bus interface 54 is also connected to the microprocessor 44 and enables the connection of additional interface cards for various options useable with the printer.

Referring back to FIG. 4, the operation of one embodiment of the system of the present invention includes the connection of the system to a host computer via the computer connector 12 and the movement of the three-position switch 14 to the PC position. This action signals the microcontroller 21 to retrieve from the EPROM 22 sufficient control programs to perform a hand shaking operation with the host PC via the control signals which include STROBE (host has a valid data strobe); SLCT (controller has been selected and is on-line); INT* (host initialize controller); SLCTin (host select device); ERR* (controller has an error); PE (out of paper); ACK* (controller received a character acknowledge); and BUSY (controller not ready to accept data). Once the hand shaking procedures are completed, the printer diagnostic controller of the present invention downloads data via the bus 25 from diagnostic software files within the PC and, following flash erasure of the contents of the flash memory 23, loads those diagnostic files and/or print data files into the flash memory 23. During the downloading of the diagnostic code from the host PC into the flash memory, the progress/ready LED 15 on the outside of the housing 11 is flashing. When the programmable diagnostic controller has completed its hand shaking process and is ready to receive the diagnostic code from the host, the LED 15 starts flashing and continues to flash while the software is downloading. Once the software is downloaded into the flash memory 23 of the present invention, then the LED 15 remains on continuously and the cables may be disconnected from the PC, and the three-position switch 14 may be turned to the off position. The portable unit retains the downloaded software in memory for future use in printers for diagnostic purposes.

The three-position switch 14 on the housing 11 can then be placed in the PTR (printer) position, and a printer connected by coupling to the printer parallel port 13. After a hand shaking operation between the printer and the microprocessor 21, the system then downloads the diagnostic portion of the software from flash memory 23 into the printer. In addition, the unit may remain connected to the printer, and the flash memory may serve as a data base of available print-files to be retrieved by the printer and used in its diagnostic and servicing operation.

Referring to the flow chart of FIG. 6, when a printer, such as that illustrated in FIG. 5, is powered on at 61 it performs a self test by executing the instructions within the instruction ROM 46 and then moves to 62 at which it determines whether or not download mode has been selected. Download mode is a special diagnostic mode which may be selected by an operator or technician when it is desired to run diagnostic programs in the printer. The mode is selected by powering on the printer while holding two designated keys, such as the "ON-LINE" and "ESC" keys, depressed on the front panel display and keypad 53 (FIG. 5). If download mode is not selected, the system moves to 63 and jumps to its normal operating system and loads that operating system from the instruction ROM 46 and awaits data to be printed. If, however, download mode was selected at 62, the system moves to 64 at which it waits for a query from the printer parallel port 42 to be received from the printer diagnostic controller of the present invention. This is in response to the hand shaking instituted by the printer diagnostic controller. Next, at 65, the printer responds to the query and the hand shaking operation, and signals the diagnostic controller that data may then be downloaded from the flash memory 23 of the diagnostic controller into the DRAM memory 48 of the printer. At 66, the printer accepts the data from the printer parallel port 42 and copies it into the DRAM 48 of the printer. For example, up to 1 MB of data may be downloaded to a specified location. This feature enables very large diagnostic programs to be input into the printer from outside, and enables the implementation of very sophisticated diagnostic routines be executed within the printer which could never be stored within the printer itself because of lack of memory space. Once the data has been downloaded into the DRAM 48 of the printer, a control instruction within the instruction ROM 46 causes the printer to jump to the downloaded code and begin execution thereof. While executing such diagnostic programs, the service technician can interface at the front panel display and keypad 53 of the printer and execute numerous diagnostic evaluative tests within the printer heretofore not possible without directly connecting the printer to a computer. Moreover, the present system enables updated diagnostic code to be periodically furnished to service technicians in either of two ways. Updated code can be sent by modem into a PC at a remote location and then downloaded into the printer diagnostic controller of the present invention, or updated code can be furnished on diskettes containing such software to technicians who then load it first into a computer and then into the diagnostic controller of the present invention.

Referring next to FIG. 7, there is shown a chart illustrating the sequence of hand shaking and data exchange messages which occur between the PC and the printer diagnostic controller in preparation for the downloading of software from the PC into the controller. The left hand column illustrates the signals originated by the host PC and the right hand column illustrates the signals and/or responses from the printer diagnostic controller. As can be seen, a sequence of signals enables the defined loading of data packets including both diagnostic software as well as print files into the flash memory 23 of the programmed printer diagnostic controller. By way of example, there is set forth below, in program design language, a communication protocol which may be used between the host PC and a programmed diagnostic controller including the following routine:

```
while (1)
{
send_header:
        send_header();
        wait_for_acknowledge_header();
        if (bad_acknowledge_or_bad_header)
                goto send_header;
        send_acknowledge ();
wait_for_packet:
        wait_for_packet();
        if(terminate_packet)
```

-continued

```
    {
        send_acknowledge ();
        goto done;
    }
    if(bad_checksum)
    {
        send_bad_acknowledge();
        goto wait_for_packet;
    }
    save_data();
© 1992 Compaq Computer Corporation
```

Referring next to FIG. 8, there is shown a table illustrating the sequence of hand shaking and data exchange messages which occur between the programmed diagnostic controller and a printer in preparation for the downloading of software from the controller into a printer. In the left hand column the signals and/or responses from the printer diagnostic controller are shown while in the right hand column are the signals sent by the printer in the course of both hand shaking and the downloading of diagnostic software from the controller into the printer.

Set forth below in program design language is a copyrighted printer diagnostic controller communications protocol which may be used in the system of the present invention:

```
while (1)
{
    wait for_header:
        wait_for_header();
        if(header_bad)
            goto wait_for_header;
        send_acknowledge_header();
        wait_for_acknowledge();
    check_for_more_data:
        if(no_more_data)
            goto done;
        prepare_new_data_packet();
    send_data_packet ();
        send_data_packet ();
        wait_for_acknowledge();
        if(bad_acknowledge)
            goto send_data_packet;
        goto check_for_more_data;
    done:
        prepare_terminate_packet();
    send_terminate_packet:
        send_terminate_packet ();
        wait_for_acknowledge();
        if(bad_acknowledge)
            goto send_terminate_packet;
}
© 1992 Compaq Computer Corporation
```

The term "nibble mode" is used to refer to a communications technique which enables the diagnostic controller to perform bi-directional communications on a parallel port. Typically the parallel port on a PC and on a printer only operates in one direction, i.e., data can only be downloaded from a PC to a printer, and the printer cannot talk back to the PC. Nibble mode, however, is a protocol that allows the printer to use control lines as data lines, so that instead of transferring 8 bits at a time, the system transfers only 4 bits at a time, and over its control lines rather than over data lines, and bi-directional communications are thereby enabled. Various suitable data exchange protocols could be used to implement such nibble mode data transfer.

Communications between the host PC and the printer diagnostic controller, and between the controller and the printer are both bi-directional. When the three-position switch 14 is in the PC position, the diagnostic controller receives data from the PC in normal mode, as described above, and sends data to the PC using nibble-mode protocol. When the three position switch 14 is in the PTR position, the diagnostic controller sends data to the printer in normal mode and receives data from the printer using the nibble-mode protocol.

As can be seen from the above description, the method and apparatus of the printer diagnostic controller of the present invention enables both diagnostic programs and print-files to be downloaded into a PC by either modem or diskette and then further loaded into the printer diagnostic controller. Thus loaded, the controller of the present invention may be carried to remote locations by a service technician and there used to further download both diagnostic programs and print-files into a printer for use by that printer in performing diagnostic and testing operations within the printer as well as serve as a data base for print-files to be used by the printer in the course of diagnostic operations therein.

It is believed that the operation and structure of the present invention and the practice thereof would be apparent from the foregoing description. While the method and apparatus shown and described has been characterized as being preferred, obvious changes and modifications may be made therein without departing from the spirit and scope of the invention as defined in the following claims:

What is claimed is:

1. A method for the diagnostic testing of printers at remote locations comprising:

downloading software to be executed by a printer from a computer into a selectively reprogrammable memory within a portable diagnostic controller;

transporting said portable controller to a remote location;

connecting said portable controller to said printer;

downloading said software stored in said reprogrammable memory of said portable controller into a second memory in said printer for testing of said printer while said printer is not coupled to any computer; and switching control of the functions of said printer from a first memory in said printer to the software contained within said second memory in said printer for diagnosing the operation of said printer.

2. A method for the diagnostic testing of printers at remote locations as set forth in claim 1 wherein:

said software consists of executable code for the diagnosis of operating conditions within said printer.

3. A method for the diagnostic testing of printers at remote locations as set forth in claim 1 wherein:

said software includes data files to be printed by said printer.

4. A method for diagnosing operating conditions within a printer having fist and second memories therein, wherein said printer is not coupled to any computer, said method comprising:

providing in the first memory of said printer, operational software for switching of control of said printer from software contained within said first memory to software contained within said second memory;

providing a portable printer diagnostic controller having a programable memory therein;

storing a diagnostic program within said progammable memory of said diagnostic controller, connecting said diagnostic controller to said printer;

downloading said diagnostic program into said second memory within said printer; and switching control of the functions of said printer from the software contained within aid first memory to the diagnostic program contained within said second memory for diagnosing the operation of said printer.

5. A system for diagnostically operating a printer, comprising:

a portable controller comprising:
- at least one communications port;
- a reprogrammable memory; and
- a microcontroller for receiving diagnostic executable software from an external computer, storing said diagnostic executable software in said reprogrammable memory and transferring the diagnostic executable software through the communications port; and a printer comprising:
- a first memory for storing instructions and data;
- a second memory for storing instructions and data;
- an input device;
- an input port;
- a print engine; and
- a processor coupled to said first memory, second memory, input device, input port and print engine, said processor being responsive to a user command issued through said input port to load said diagnostic executable software from said controller into said second memory and switch control of said printer to said diagnostic executable software contained in said second memory and execute said diagnostic executable software while said controller and said printer is not coupled to said external computer or any other computer.

6. The system of claim 5 wherein said input device comprises a panel with keys.

7. The system of claim 5 wherein said printer further comprises an output device coupled to said processor for outputting test information to the user.

8. The system of claim 5 wherein the input device may be accessed by the user to instruct the printer to execute said diagnostic software.

9. The system of claim 5 wherein said processor, under control of said diagnostic software, loads data files from the controller.

10. The system of claim 5 wherein said input port is a parallel port.

* * * * *